Jan. 2, 1968          H. E. STEVENS          3,361,482

WHEEL ADAPTER CONSTRUCTION

Filed June 14, 1966

*INVENTOR.*
HAROLD E. STEVENS
BY *M. Ralph Shaffer*
HIS ATTORNEY

United States Patent Office 3,361,482
Patented Jan. 2, 1968

3,361,482
WHEEL ADAPTER CONSTRUCTION
Harold E. Stevens, 672 North 1st West,
Brigham City, Utah 84302
Filed June 14, 1966, Ser. No. 562,998
4 Claims. (Cl. 301—9)

ABSTRACT OF THE DISCLOSURE

The present invention provides an adapter plate for selective mounting to a trailer axle, this to accommodate the mounting thereto of the spare tire of the towing vehicle. Multiple sets of apertures, suitable for receiving bolts to bolt the spare tire's rim thereto, are provided at mutually different radial distances, to accommodate a variety of lug hole patterns of the rim. Recesses are provided in the adapter plate to receive the securement bolts and to prevent the heads thereof from rotating.

---

The present invention relates to adapter plates, and, more particularly, to a wheel adapter plate whereby the spare tire of a vehicle may be used to replace a trailer wheel or tire even though the lug patterns of the vehicle and trailer wheels are divergent in character.

In the past the drivers of vehicles towing trailers have had difficult problems when a tire of the trailer needs replacing. If a blowout or other malady should chance to occur to a trailer tire while in transit, the user will stop, remove the trailer tire, and proceed to the nearest service station for repair. Practically all trailers do not come equipped with spare tires.

It would of course be a great advantage if the driver of a vehicle could use the spare tire customarily carried in the trunk of his automobile or truck in order to replace the damaged tire of the trailer. (In the context of the present invention the term "tire" and 'wheel" are used synonymously and connote both the rim and normal tire mounted thereon.)

In the past there has been conceived the idea of having an adapter plate provided whereby the same could be mounted to the axle of a trailer and thus accommodate the mounting of the vehicle's spare tire thereto. The problem, of course, is that of divergence in hole pattern of the trailer wheel from the wheel-stud pattern of the vehicle's spare tire. This divergence comes about because of various makes of automobiles and their various lug and lug-hole patterns for wheels which, more often than not, differ in character from that employed in a trailer wheel mounting.

Adapter devices heretofore conceived have been unusually expensive to make and cumbersome to adjust and operate. Frequently there are mounting ears which must be independently adjusted or other constructions which are time consuming to manipulate for an easy mounting wheel.

Accordingly, a principal object of the present invention is to provide a new and improved adapter plate to accommodate the selective mounting of spare tires or wheels to trailer axles.

A further object is to provide an adapter plate of the type described which is extremely simple and inexpensive to make and which requires a minimum of component parts.

An additional object of the present invention is to provide an adapter plate which automatically accommodates a number of different, standard, hole patterns found in the rims of vehicle wheels, such that the spare tires or wheels of several makes of cars may be used for mounting, via the adapter plate, to the axle of the trailer.

An additional object of the invention is to provide an adapter plate whereby auxiliary bolts used to mount the spare tire to a trailer are held against rotation in the adapter plate used, yet are selectively removable for selective replacement in any one of hole patterns as needed.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
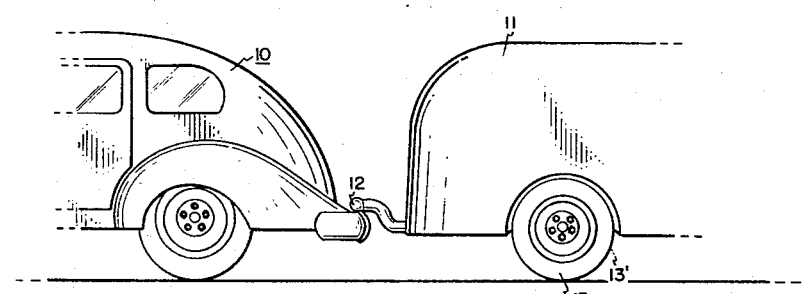
FIGURE 1 is a side elevation in diagrammatic form of a vehicle and trailer combination which may employ the features of the present invention.

In FIGURE 1, automobile 10 is shown towing a trailer 11 by means of trailer drawbar hook-up 12. Suppose a left front tire 13 goes flat or otherwise needs replacement by tire 13'. Tire 13' may in fact comprise the spare tire of vehicle 10. In this way a separate spare tire will not have to be provided for trailer 11. Various makes of cars or vehicles have various types of wheel lug patterns and, of course, the spare tire associated with a particular vehicle will have a rim hole pattern unique to that make of vehicle. It is at this point that the inventor's adapter plate comes into play.

Figure 2:
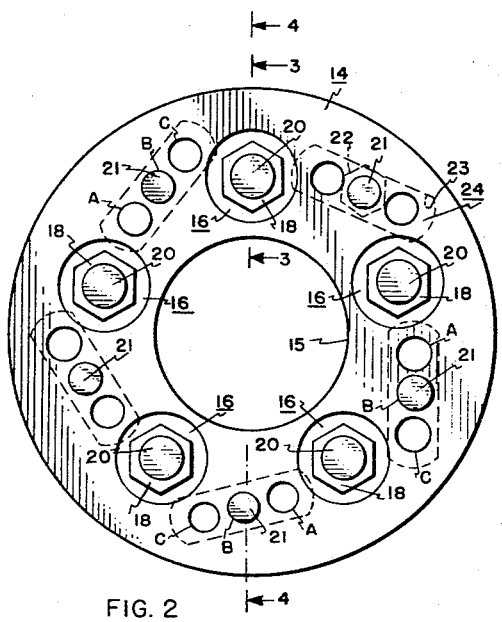
FIGURE 2 is a plan of the adapter plate used in the present invention.
Figure 4:
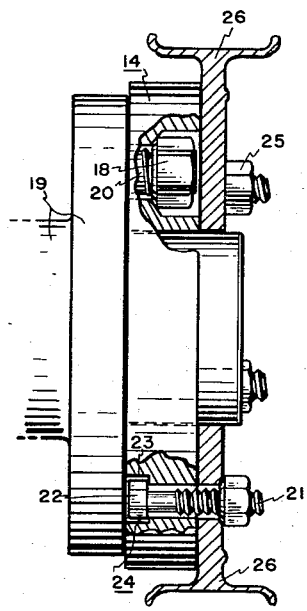
FIGURE 4 is a view taken along the lines 4—4 in FIGURE 2, and is partially in section, and illustrates the adapter plate of the present invention when used in conjunction with a trailer axle, spare-tire rim, and attachments.
Figure 3:
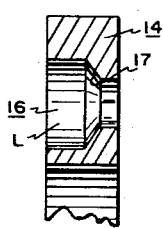
FIGURE 3 is a sectioned detail taken along the line 3—3 in FIGURE 2.

The adapter plate is illustrated at 14 in FIGURES 2–4. The same preferably comprises a metal disc having a central aperture 15 and plural primary lug apertures 16 which are countersunk in respective areas 17 thereof. The countersunk bores or apertures 16, having enlarged areas L, accommodate lug nuts 18 provided the trailer and which normally keep the regular wheel of the trailer secured to the trailer axle assembly 19. Threaded studs 20 are outwardly directing and are provided by the axle assembly 19 of the trailer.

FIGURE 4 illustrates the manner in which adapter plate 14 is secured to axle assembly 19 of the trailer. It is noted that the trailer lug nuts 18 secure adapter plate 14 to axle 19. Further, the trailer lug nuts 18 secure adapter plate 14 to axle 19. Further, the trailer lug nuts 18 are shown to be preferably recessed in their mounting within the several respective countersunk apertures or bores 16 as indicated in FIGURE 4.

At this point it should be mentioned that, immediately prior to the attachment of adapter plate 14 to axle assembly 19, one of the hole patterns A, B, C, provided in the adapter plate will be selected, a particular selection depending upon the rim-hole character of the spare tire to be used ,through which holes or apertures the auxiliary bolts 21 will be placed. As seen in FIGURE 4, these bolts 21 have hexagonal heads 22 which are retained in position and against turning by the sides 23 of enlarged areas or shouldered recesses 24. While individual recessed areas may be used for each aperture A, B, C, it is deemed preferably to provide common recesses for corresponding holes of each aperture set. These recesses (five are indicated) are either cast or milled into the adapter plate 14.

In operation, the hole patterns at A, B, and C will correspond to anticipated lug hole patterns of various vehicles on the market. The particular hole pattern selected will correspond with the hole pattern of the rim of the spare tire of the vehicle in use.

Preliminary insertion of the auxiliary bolts in the respective selected holes will be accomplished, of course, immediately prior to the positioning of adapter plate 14 over the several studs 20 of the trailer axle. The lug nuts 18 are then tightened down and the spare tire mounted over the auxiliary bolts 21. Auxiliary lug nuts 25 are next placed and tightened down to secure to rim 26 of the spare tire 13' to adapter plate 14 and hence to axle 19.

What is thus provided is a means whereby the spare tire of any given vehicle can be used for direct mounting to the axle of the trailer towed. This accommodates whatever the anticipated divergence is experienced between the lug hole pattern of the vehicle's spare tire and the trailer axle stud pattern.

While particular embodiments of the present invention have been shown and described, it will be obvious to those skilled in the art that changes and modifications may be made without departing from this invention in its broader aspect, and, therefore, the aim in the appended claims is to cover all such changes and modification as fall within the true spirit and scope of this invention.

I claim:

1. A wheel adapter comprising a rigid plate having a plurality of mutually spaced lug apertures transversely disposed therethrough, each of said apertures being provided with an enlarged area for interiorly receiving and containing securement lugs, said adapter plate also being provided with plural sets of additional apertures disposed therethrough and constructed to accommodate the placement of bolts through a chosen set thereof to mount a tire rim thereto, the apertures in each set being located at a different radial distance, with respect to the center of said plate, from those respective radial distances of the remaining sets, said additional apertures being provided with bolt-head containing recesses disposed in said plate on the opposite side thereof with respect to said enlarged areas of said lug apertures.

2. A wheel adapter comprising a rigid plate having a plurality of mutually spaced lug apertures transversely disposed therethrough, each of said apertures being provided with an enlarged area for interiorly receiving and containing securement lugs, said adapter plate also being provided with plural sets of additional apertures disposed therethrough and constructed to accommodate the placement of bolts through a chosen set thereof to mount a tire rim thereto, the apertures in each set being located at a different radial distance, with respect to the center of said plate, from those respecctive radial distances of the remaining sets, said additional apertures being provided with bolt-head containing recesses disposed in said plate on the opposite side thereof with respect to said enlarged areas of said lug apertures, and wherein said recesses of corresponding ones of said apertures of said sets inter- communicate, for receiving the heads of securement bolts and preventing the same from rotating.

3. For mounting to an axle of a vehicle, said axle having outwardly protruding threaded studs, an adapter plate having plural lug apertures transversely disposed therethrough in correspondence with and receiving said studs, said adapter plate also including plural sets of individual apertures transversely disposed therethrough, the apertures in each set being located at a different radial distance, with respect to the center of said plate, from those respective radial distances of the remaining sets, each of said individual apertures being provided with a recessed area on the axle-side of said plate, each of said lug apertures being provided with a recessed area on the opposite side of said plate, plural lug nuts threadedly engaging said studs and seated within said recessed areas of said lug apertures, and plural bolt means disposed through a selected set of said apertures and extending outwardly from said axle, each of said bolts including respective heads received in said recessed areas of said aperture set and being retained thereby from turning movements.

4. A wheel adapter comprising a rigid plate having a plurality of mutually spaced lug apertures transversely disposed therethrough, each of said apertures being provided with an enlarged area for interiorly receiving and containing securement lugs, said adapter plate also being provided with plural sets of additional apertures disposed therethrough and constructed to accommodate the placement of bolts through a chosen set thereof to mount a tire rim thereto, the apertures in each set being located at a different radial distance, with respect to the center of said plate, from those respective radial distances of the remaining sets, said additional apertures being provided with bolt-head containing recesses disposed in said plate on the opposite side thereof with respect to said enlarged areas of said lug apertures, and wherein said recesses of corresponding ones of said apertures of said sets are interconnected to form common recess slots.

References Cited

UNITED STATES PATENTS

| | | | |
|---|---|---|---|
| 2,067,620 | 1/1937 | Johnston. | |
| 2,570,559 | 10/1951 | Juergenson. | |
| 2,779,630 | 1/1957 | Klinker | 301—9 |
| 2,970,008 | 1/1961 | Leach | 301—9 X |
| 3,025,109 | 3/1962 | Martin | 301—9 |
| 3,166,357 | 1/1965 | Vachon | 301—9 |

FOREIGN PATENTS 859,193    1/1961    Great Britain.

RICHARD J. JOHNSON, *Primary Examiner.*